US012794672B2

(12) United States Patent
Corcoran

(10) Patent No.: US 12,794,672 B2

(45) Date of Patent: Nov. 10, 2026

(54) PROCESSING DATA OBJECTS IN A CLOUD-BASED SYSTEM

(71) Applicant: Verisec International AB, Stockholm (SE)

(72) Inventor: Aidan Corcoran, Dänischenhagen (DE)

(73) Assignee: Verisec International AB, Stockholm (SE)

( * ) Notice: Subject to any disclaimer, the term of this patent is extended or adjusted under 35 U.S.C. 154(b) by 7 days.

(21) Appl. No.: 19/187,219

(22) Filed: Apr. 23, 2025

(65) Prior Publication Data

US 2026/0012331 A1 Jan. 8, 2026

(30) Foreign Application Priority Data

Jul. 5, 2024 (SE) .................................... 2450776-6

(51) Int. Cl.

*H04L 9/08* (2006.01)
*G06Q 20/38* (2012.01)
*H04L 9/32* (2006.01)

(52) U.S. Cl.

CPC ....... *H04L 9/0819* (2013.01); *G06Q 20/3829* (2013.01); *H04L 9/0863* (2013.01); *H04L 9/3213* (2013.01)

(58) Field of Classification Search

CPC ..... G06F 21/335; G06F 21/602; G06Q 20/10; G06Q 20/3829; G06Q 20/40975; H04L 2209/56; H04L 63/06; H04L 63/062; H04L 9/0819; H04L 9/0822; H04L 9/0838; H04L 9/085; H04L 9/0863; H04L 9/0877; H04L 9/0897; H04L 9/3213; H04L 9/3234

See application file for complete search history.

(56) References Cited

U.S. PATENT DOCUMENTS

| | | | |
|---|---|---|---|
| 9,571,279 B2 | 2/2017 | Kancharla et al. | |
| 10,447,668 B1 | 10/2019 | Norum | |
| 11,544,677 B2 | 1/2023 | Vagare et al. | |
| 11,626,985 B1 | 4/2023 | Copparapu et al. | |
| 2016/0241393 A1* | 8/2016 | Boenisch | H04L 9/3271 |
| 2016/0261408 A1* | 9/2016 | Peddada | H04L 9/0894 |

(Continued)

OTHER PUBLICATIONS

Swedish Search Report issued on Dec. 6, 2024, Swedish Patent Application No. 2450776-6, filed on Jul. 5, 2024, consisting of 2 pages.

*Primary Examiner* — Theodore C Parsons

(74) *Attorney, Agent, or Firm* — Weisberg I.P. Law, P.A.

(57) ABSTRACT

There is provided a method performed by a computing device for processing data objects in a cloud-based system. The method includes generating a group of different hardware security module, HSM, master keys shared by a plurality of identical HSMs, and receiving a request from a customer application, wherein the request comprises one or more data objects and an encrypted version of a customer working key. The method further includes associating the received request with a unique HSM master key from the group of different HSM master keys, decrypting the encrypted version of the customer working key and encrypting the customer working key using the unique HSM master key. The method further comprises sending the one or more data objects with the encrypted customer working key using the unique HSM master key to a randomly selected HSM from the plurality of identical HSMs.

16 Claims, 8 Drawing Sheets

(56) References Cited

U.S. PATENT DOCUMENTS

| | | | | |
|---|---|---|---|---|
| 2016/0283723 | A1* | 9/2016 | Roth | H04L 9/0897 |
| 2019/0305951 | A1* | 10/2019 | Grubin | H04L 9/30 |
| 2023/0020193 | A1 | 1/2023 | Williams et al. | |

* cited by examiner

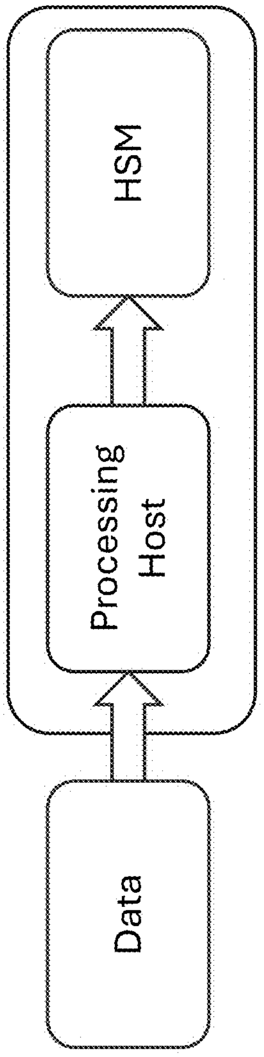
Figure 2a. an example of prior art
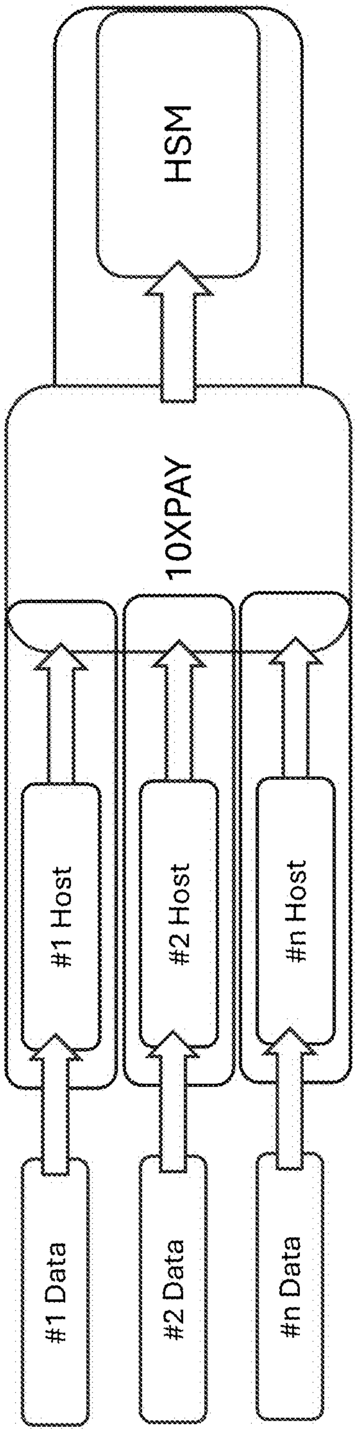
Figure 2b. an example of the proposed solution of the present invention

100

PROCESSING DATA OBJECTS IN A CLOUD-BASED SYSTEM

CROSS-REFERENCE TO RELATED APPLICATION

This Application is related to and claims priority to Swedish Application No. 2450776-6, filed Jul. 5, 2024, the entire contents of which is incorporated herein by reference.

TECHNICAL FIELD

Embodiments presented herein relate to a method and a computing device for processing data objects, such as cryptographic data objects, in a cloud-based system.

BACKGROUND

Cryptographic elements are important technological components in today's widely used computer systems. Information may be stored or transmitted in a cryptographically secured form to avoid unauthorized access to the information stored or transmitted. Depending on the use cases, either pure software-based techniques or hardware support and security specific elements may be used to perform such data protection. In some cases, these specific cryptographic elements are named hardware security modules (HSMs), which may be used as part of a computer system. Such a HSM may be a specialised physical computing device that contains: a secure cryptographic processor that performs cryptographic operations, secure memory for holding sensitive data, such as unencrypted keys, and random number generator to generate secure keys.

HSMs contain master keys (in other words, HSM master keys) that may not be accessible to unauthorized parties. These HSM master keys are used to encrypt (i.e., wrap) keys available to the users of the HSM. Keys wrapped by a HSM master key may be called secure keys. The only place sensitive cryptographic keys may be available in an unencrypted form is within the secure confines of the HSM itself. HSMs are tamper-proof and protect the secret against unauthorized access, theft and manipulation.

Cryptographic HSM infrastructure is a critical part of any payment system. Payment HSM s as specialist devices provide the physical and logical security needed to protect the sensitive cryptographic keys that are fundamental to secure payment systems—including card and mobile payments.

There are a number of challenges payments businesses may face with Payment HSMs, including:

- Integration: Payment HSMs have proprietary protocols and varying security configurations which can make deployment and integration complex as well as leading to vendor lock-in.
- Expertise: Payment HSMs are highly specialized devices and so finding and retaining personnel with knowledge and experience of managing them can be difficult. Furthermore, relying on inexperienced personnel could result in operational errors leading to security vulnerabilities and service outages.
- Compliance: Payment HSMs are required to comply with industry standards such as PCI DSS and sometimes local payment industry requirements. Keeping up to date with these and ensuring relevant upgrades have been applied is time-consuming.
- Scalability: Payment systems need to be sized to support peak loads, which can be much higher than the background or average load on the system. This can mean expensive HSMs are under-utilized or even idle much of the time.

Moving payment HSMs to the cloud can address many of the above issues—especially where the cloud provider has dedicated payments HSM expertise and can provide scalable and compliant services. This can enable payment businesses to benefit from the resilience, scalability and business models offered by other cloud services. There are a number of cloud payment HSM offerings available today. However, there is still a need for improved cloud-based HSM solutions to further address challenges payments businesses are facing.

SUMMARY

It is an objective of the embodiments herein to provide methods and devices that aid and exploit resource sharing of cryptographic processing hardware, to efficiently allocate the processing resources among multiple users (i.e., customers) during variable loads such as peak loads and average loads. Furthermore, an objective is to allow multiple users to perform cryptographic requests independently and with separation of sensitive cryptographic material between users.

According to an aspect of some embodiments herein, there is illustrated a method performed by a computing device for processing data objects in a cloud-based system. The method comprises generating a group of different hardware security module, HSM, master keys shared by a plurality of identical HSMs, and receiving a request from a customer application, wherein the request comprises one or more data objects and an encrypted version of a customer working key. The method further comprises associating the received request with a unique HSM master key from the group of different HSM master keys, decrypting the encrypted version of the one or more customer working keys and encrypting the one or more customer working keys using the unique HSM master key. The method further comprises sending the one or more data objects with the encrypted one or more customer working keys using the unique HSM master key to a randomly selected HSM from the plurality of identical HSMs.

According to another aspect of some embodiments herein, there is disclosed a computing device for processing data objects in a cloud-based system. The computing device comprises a processor and a memory containing instructions executable by said processor, wherein the computing device is operative to generate a group of different hardware security module, HSM, master keys shared by a plurality of identical HSMs, and to receive a request from a customer application, wherein the request comprises one or more data objects and an encrypted version of a customer working key. The computing device is further operative to associate the received request with a unique HSM master key from the group of different HSM master keys, to decrypt the encrypted version of the one or more customer working keys, and to encrypt the one or more customer working keys using the unique HSM master key. The computing device is further operative to send the one or more data objects with the encrypted one or more customer working keys using the unique HSM master key to a randomly selected HSM from the plurality of identical HSMs.

An advantage of the embodiments herein is to provide improved resource sharing of cryptographic processing hardware.

Another advantage of the embodiments herein is to separate individual user data for increased security.

Additional advantages of the embodiments herein are provided in the detailed description of this disclosure.

BRIEF DESCRIPTION OF THE DRAWINGS

Embodiments of the present disclosure are now described in further detail with reference to the accompanying drawings, in which:

FIG. 2*a* is a block diagram illustrating an example of a classic HSM configuration;

FIG. 2*b* is a block diagram illustrating a HSM configuration according to some embodiments;

DETAILED DESCRIPTION

In this disclosure, methods and computing devices for processing data objects, such as cryptographic data objects, in a cloud-based system have been presented. Data objects may be customer data such as customer payment data.

One important approach among Cloud Payment HSM approaches is "payment cryptography as a service" approach. The payment HSM service Provider owns, operates and manages sets of HSMs that are used by multiple customer applications in parallel.

Figure 1:
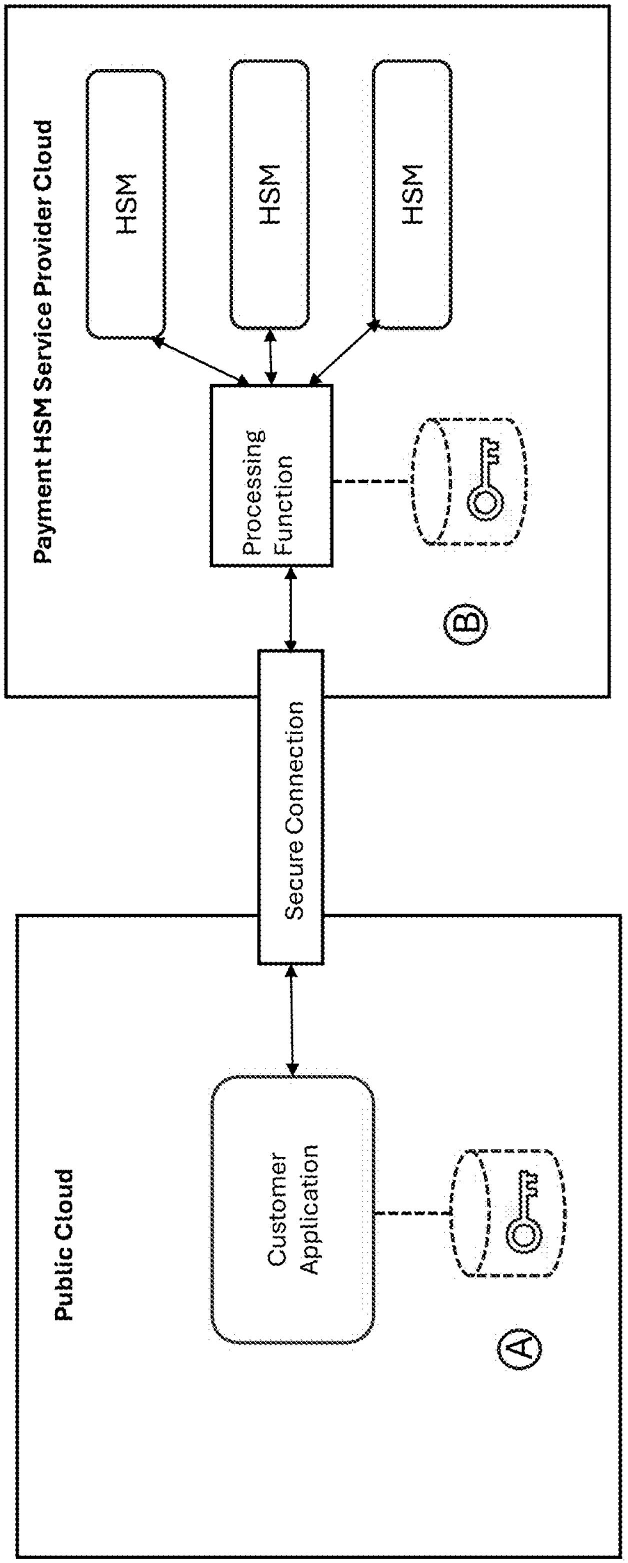
FIG. 1 is a block diagram illustrating an example of the "payment cryptography as a service" approach.

FIG. 1 is a block diagram illustrating an example of the "payment cryptography as a service" approach in a cloud-based system. In some cases, cloud-based system means a network of connected computing and communication resources that may not be actively managed by a user. As shown in FIG. 1, there is a secure connection between a public cloud where the customer application resides in and a payment HSM service provider cloud where the HSMs and the processing function reside in. The processing function is used to process data objects. The payment HSM service provider sources, owns, hosts and operates PCI-approved (where PCI stands for Payment Card Industry) H S Ms. The payment HSM service provider will be fully responsible for HSM provisioning and key management. Optionally, the payment HSM service provider will provide cloud storage of encrypted customer working keys (database "B" in the diagram above). In other cases, the encrypted customer working keys will be stored with the customer application in a database managed by the customer application owner (database "A" in the FIG. 1). A dotted line in FIG. 1 indicates that it is an optional solution.

With payment cryptography as a service, the customer application owner interacts with a "service". The underlying HSMs will have been arranged so that the service offers full multi-tenancy. Multiple customer applications can use the same cryptographic infrastructure simultaneously with the Payment HSM Service Provider.

The customer application Owner does not need to lease sufficient capacity to handle peak loads but instead can pay based on actual usage of the service. The Payment HSM Service Provider will, of course, need to ensure that the service as a whole can support the peaks it may experience—and this will need to be accounted for in the per-usage pricing.

Optionally, access to the payment HSM service will be via REST APIs defined by the provider. It is also possible that the payment HSM service provider could expose the native HSM APIs as well to provide backwards compatibility to legacy customer applications.

Payment HSM Service Providers may have high speed connections into public cloud environments, to ensure sufficient throughput and low latency requirements of public cloud hosted customer applications.

FIG. 2*a* is a block diagram illustrating an example of a classic HSM configuration with one or more HSMs (only one HSM is shown for simplicity reason) connected to a processing host. As transaction data is received by the processing host, the relevant data is sent to the HSM for processing. The processing host and the HSMs are often under the control and ownership of a user and are typically located in close physical proximity to each other. There is typically a single security zone (i.e., security relationship) between the processing host and the HSM. In this configuration, the HSM is only used by a single user.

FIG. 2*b* is a block diagram illustrating a HSM configuration according to some embodiments proposed in the present disclosure. The term "10XPAY" is a middleware between the processing host and the HSM based on solutions proposed in the present disclosure. The "10XPAY" middleware manages the connectivity between customers and the various internal micro-services within 10XPAY to ensure fail-over and high availability in the event of a software or hardware failure. As shown in FIG. 2*b*, each user (and his user data) is provided with an application programming interface (API) that provides the same API that a classic HSM would provide. Although 10XPAY middleware processes each user API interaction prior to delivery to a class HSM, the user does not experience any difference. As the transaction data is processed by 10XPAY, the middleware securely transforms the transaction data from a user security zone to a security zone which is shared between 10XPAY and the processing HSM.

The classical HSM configuration provides for the HSM to be used by a single user. Multiple users of an individual HSM does not facilitate enough separation between the individual Users data. The 10XPAY middleware is able to intermediate between any user security zone and the processing HSM security zone. Each user experiences exclusive use of the 10XPAY service while ultimately securely sharing the processing HSM.

Optionally, the user API is abstracted from the processing HSM. Since the HSM in FIG. 2*b* may be the same kind of HSM as a class HSM as shown in FIG. 2*a*, it is possible to have a hybrid configuration mixing the classic HSM configuration with a partial 10XPAY deployment as proposed in the present disclosure.

Figure 3:
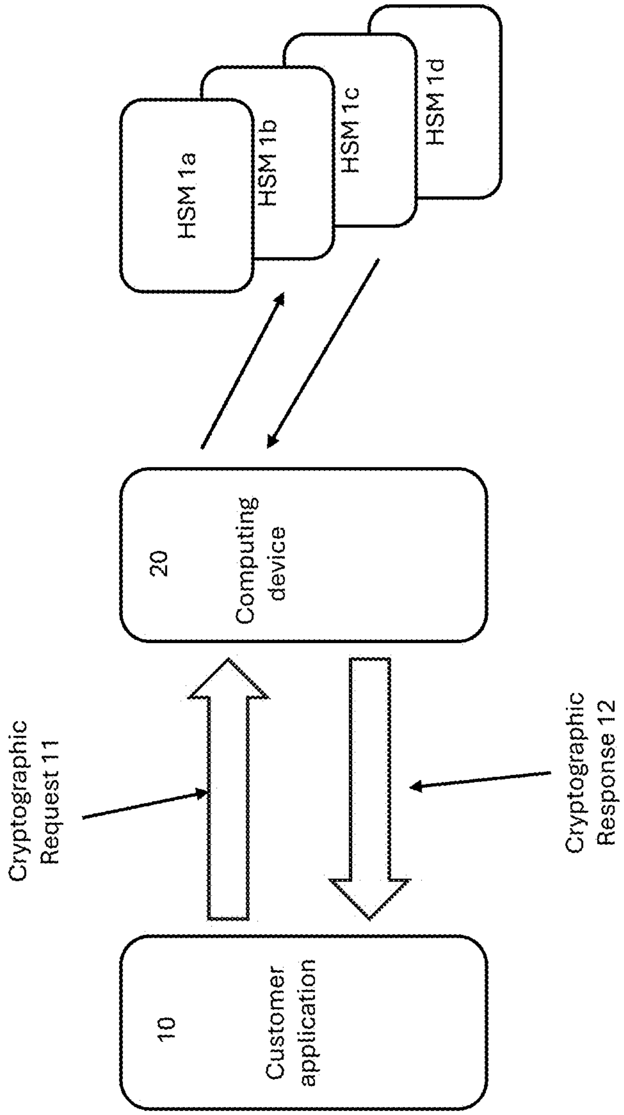
FIG. 3 is a block diagram illustrating an overall flow between a customer application and a plurality of HSMs according to some embodiments.

FIG. 3 is a block diagram illustrating an overall flow between a customer application 10 and a plurality of HSMs 1*a*, 1*b*, 1*c*, 1*d* performing cryptographic operations, via a computing device in a cloud-based system 100 according to some embodiments. The computing device 20 accepts a group of data objects, which form a cryptographic request 11, from the customer application 10. The cryptographic request 11 is processed by the computing device 20, and then passed to one of the HSMs 1*a*, 1*b*, 1*c*, 1*d* to perform the cryptographic operation. The specific HSM chosen to perform the cryptographic operation may be selected at random. The cryptographic request 11 may be encrypted by a set of customer master keys. Optionally, the cryptographic request comprises one or more data objects that are encrypted by one or more customer master keys. The processing by the computing device 20 involves the decryption of the cryptographic request 11 using the customer master Keys and the re-encryption of the cryptographic request using master Keys that are shared between the computing device 20 and the HSMs (i.e., HSM master keys). The underlying data in the cryptographic request is unchanged. When the cryptographic processing is completed, a cryptographic response is created by the HSM. This cryptographic response is returned to the computing device 20.

Optionally, a computing device 20 is a distributed system comprising multiple software components that are on multiple computers but run as a single system. Optionally, the computers in a distributed system can be physically close together and connected by a local network, or they can be geographically distant and connected by a wide area network.

Optionally, the computing device 20 may decrypt the cryptographic response using the HSM Master Keys and re-encrypt it with the customer master keys. The computing device 20 then returns the cryptographic response 12 to the customer application.

Optionally, a customer application may be used interchangeably with a customer host application, a customer software application, or a business application.

Details regarding how to use encryption keys in the present disclosure according to some embodiments are further described below.

Figure 4:
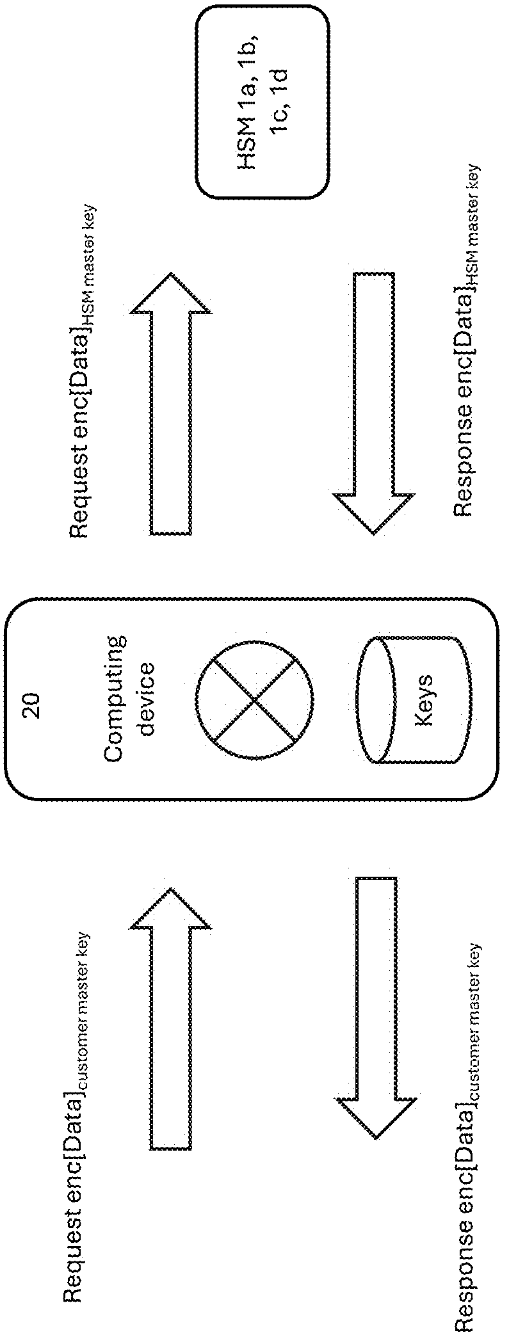
FIG. 4 is a block diagram illustrating an example of cryptographic processing according to some embodiments.

FIG. 4 illustrates an example of cryptographic processing according to embodiments, where encryption keys are used for each of the data objects processed by the computing device 20. It is shown in FIG. 4 that when sending cryptographic request to the computing device, at least some data objects are encrypted with the customer master key, i.e., Request enc$[\text{Data}]_{customer\ master\ key}$ as indicated in FIG. 4. Optionally, a subset of the data objects is encrypted with one or more customer master keys. Optionally, all the data objects are encrypted with one or more customer master keys. When this cryptographic request is sent to the HSM, the data objects are encrypted with the HSM Master Key, i.e., Requestenc$[\text{Data}]_{HSM\ master\ key}$ as indicated in FIG. 4. The cryptographic response from the HSM can contain data objects which are encrypted with the HSM Master Key, i.e., Response enc$[\text{Data}]_{HSM\ master\ key}$ as indicated in FIG. 4. The cryptographic response that is sent to the customer application may contain data objects encrypted with the customer master key, i.e., Response enc$[\text{Data}]_{customer\ master\ key}$ as indicated in FIG. 4. The computing device 20 supports a number of customers, each customer being associated with one or more master keys. The computing device 20 supports a plurality of HSMs 1*a*, 1*b*, 1*c*, 1*d*, in other words, a HSM pool, each HSM with an identical configuration, which contain a group of HSM master keys. All master keys including HSM masters keys and customer master keys may be stored in a secure database.

The computing device 20 may identify which customer master key are being used and retrieves them from the secure database. The computing device 20 may randomly selecta HSM Master Key from the secure database. The computing device 20 may decrypt the cryptographic request using the customer master Key and encrypt it with the randomly selected HSM Master Key.

The computing device 20 sends the cryptographic request encrypted with the randomly selected HSM master key to the HSM Pool, where it is processed by one of the HSMs. The HSM returns the cryptographic response to the computing device, which may optionally contain encrypted data objects.

Optionally, these encrypted data objects are decrypted by the computing device 20 using the HSM master Key and then encrypted by the customer master Key. The computing device 20 returns the response to the customer application.

In one example, the cloud HSM user sends a HSM request (i.e., demand) containing some application data and one or more customer working keys encrypted with the customer master key to the computing device. The encrypted HSM request with application data is received by the computing device. The computing device retrieves the customer master key from a central database. The computing device allocates a HSM Master Key. The computing device retrieves the HSM Master Key from the central database and decrypts it using the cloud HSM operator storage Key. The storage key represents an encryption key used by the computing device to protect both customer master keys and HSM master keys when stored in a database. The computing device decrypts the retrieved customer master key with the cloud HSM operator storage Key. The computing device decrypts the customer working key with the customer master key. The computing device encrypts customer working key with the HSM master key. The computing device sends the HSM request (i.e., Requestenc$[\text{Data}]_{HSM\ master\ key}$ as in FIG. 4) with the customer working key encrypted with the HSM master key to the HSM. The HSM decrypts the customer working key using the HSM master key. The HSM processes the HSM request with the customer working key. The result of the HSM request is returned to the computing device. The computing device returns the result of the HSM request (i.e., Response enc$[\text{Data}]_{customer\ master\ key}$ as in FIG. 4) to the cloud HSM user.

Further secure measures can be used by using a secure device to generate customer master keys, as shown below in details.

Figure 5A:
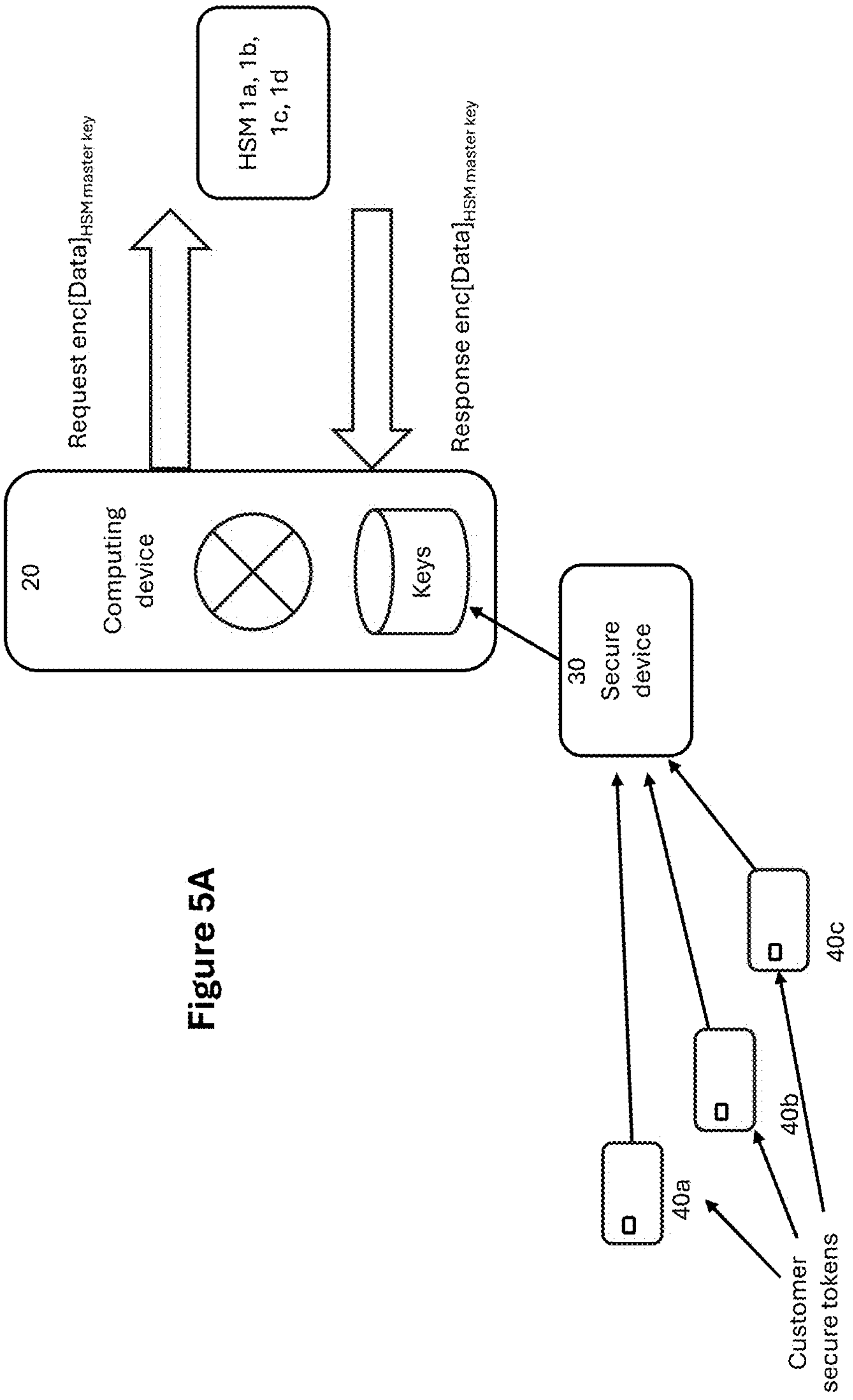
FIGS. 5A and 5B are block diagrams illustrating different examples where a customer communicates a customer master key to a computing device according to some embodiments.

FIG. 5A illustrates an example where a customer communicates his/her master key (i.e., customer master key) to the computing device 20 in a secure manner according to some embodiments. F or security reasons, the customer may maintain their customer master key split across a number of secure tokens. In some embodiments, a secure token is a smart card. A minimum number of secure tokens is required to create the customer master key. Each secure token or smart card contains a key component of the customer master key. A key component may also be named as a key share.

As shown in FIG. 5A, a secure device (or a secure hardware device) 30 is used to read key components from a number of secure tokens (such as customer secure tokens) 40*a*, 40*b*, 40*c*. The key components obtained from the number of customer secure tokens 40*a*, 40*b*, 40*c* are combined within the secure device 30 to get a customer master key. The customer master key is then transmitted to the computing device 20 in a secure manner, for example, by using one-time session keys. No key components or key information is retained by the secure device 30 following the transmission. In some embodiments, the secure device 30 may be a key loading device. The computing device 20 is further communicated with a plurality of HSMs 1*a*, 1*b*, 1*c*, 1*d*.

Figure 5B:
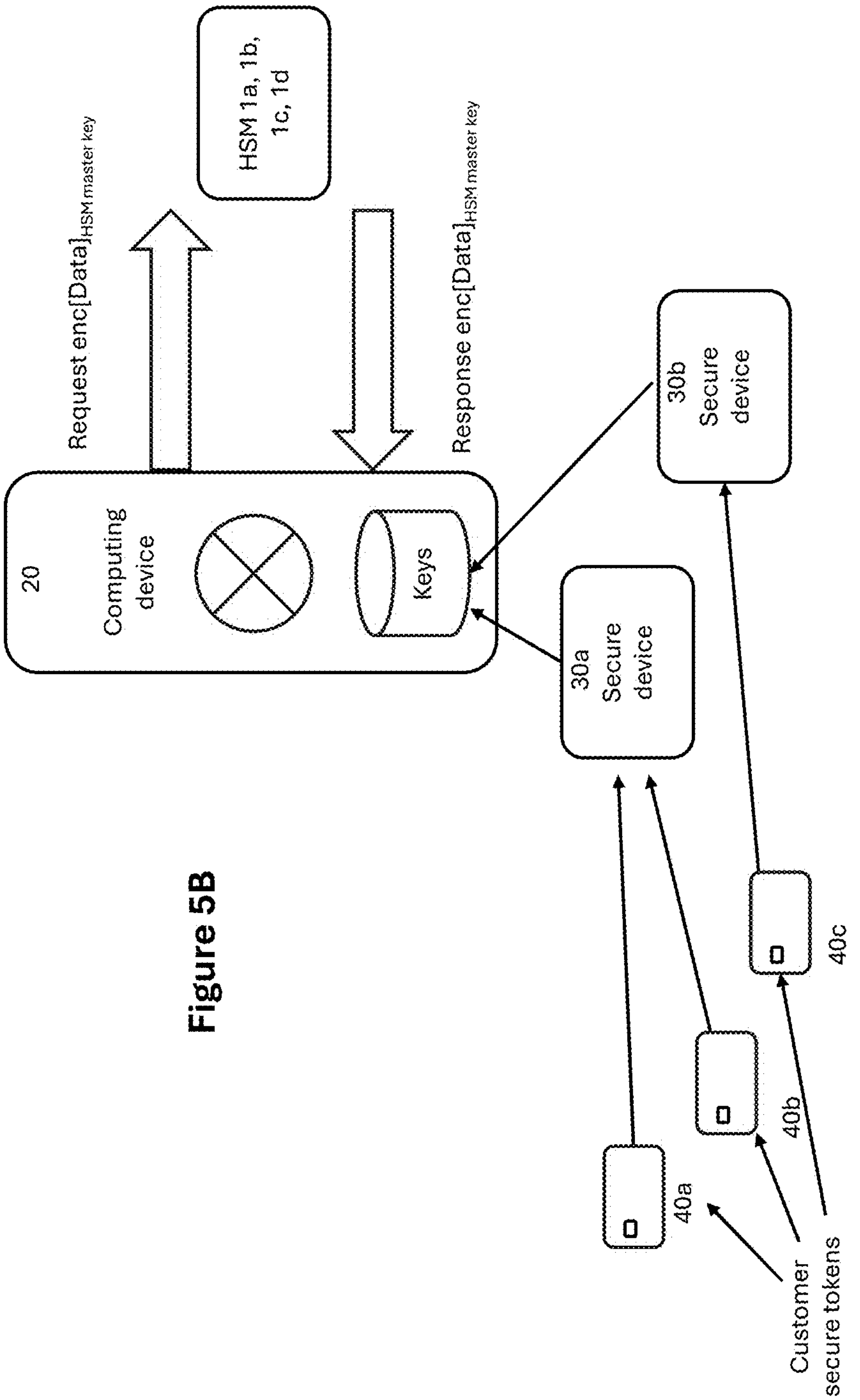

FIG. 5B illustrates another example where a customer communicates his/her master key (i.e., customer master key) to the computing device 20 in a secure manner according to some embodiments. Instead of a single secure device 30 as shown in FIG. 5A, in FIG. 5B, there are two secure devices 30*a* and 30*b*. Optionally, these two secure devices 30*a* and 30*b* may be located atone physical location. Optionally, these two secure devices 30*a* and 30*b* may be located at more than one physical location. The advantage of locating two or more secure devices in more than one physical location is to allow secure tokens to be in different physical locations, reducing the time and cost of bringing the secure tokens to the same physical position, A secure device may also be referred to as a secure hardware device.

One example is the CVV2 value on the signature panel of a customer's credit card. This value comes from a cryptographic calculation using your card number, the expiration date, some fixed data (such as 000) and a cryptographic working key. Typically, the customer's bank will have several cryptographic working keys used for CVV calculations. Since the raw data for the calculation and the algorithm (e.g., https://en.wikipedia.org/wiki/Card_security_code) is public, security of the cryptographic working keys is vital to prevent criminals duplicating or generating values for their own use.

For a customer's credit card, there are normally up to 8 different working keys controlling various aspects of the transaction process. A bank that issues various credit cards (student, gold, platinum, business, etc.) will have different cryptographic working keys for each card type—and this can quickly add up to tens or even hundreds of cryptographic working keys being managed by an organisation.

The same applies to payment card processing equipment—each credit card machine (i.e., payment terminal) may have one, or more than one cryptographic working keys—the same applies to ATMs and unattended payment devices. A Payment Service Provider can be dealing with thousands of cryptographic working keys.

The security of these customer working keys is important—the keys need to be stored somewhere, typically encrypted under a customer master key.

The customer master key also needs to be able to move around—for example to load it onto new secure appliances. For this kind of work, the customer master key may be stored as key shares or key components.

While these components can be written down on paper (and this can still happen for shorter components), the (longer) components for a storage key are typically stored on a smart card or a USB stick. Smartcards allow for additional security, such as PINs, to prevent unauthorised access. Smart cards also have the ability to encrypt the traffic between the smart card and the device reading the smart card. This prevents man-in-the-middle attacks.

Optionally, a secure device such as a key loading device (KLD) is used for generating master keys.

Single use elements (such as one-time session keys) are a valuable tool when it comes to minimising an attack.

Optionally, one-time session keys are used to protect key material as it moves around. Key material is always encrypted when it's moving around between different system components of a system by using one-time session keys.

The components for a customer master key are loaded into the KLD using smart cards. Inside the KLD, which is a tamper responsive device, the customer master key is re-created. To transfer the customer master key to the computing device, a session key is established using for example the Diffie-Hellman (DH) key exchange method (details of which can be found at https://en.wikipedia.org/wiki/Diffie % E2%80%93Hellman_key_exchange). This one-time session key is discarded after it's used. In case a second or subsequent one-time session key is required, a new DH key exchange will be performed.

Figure 6:
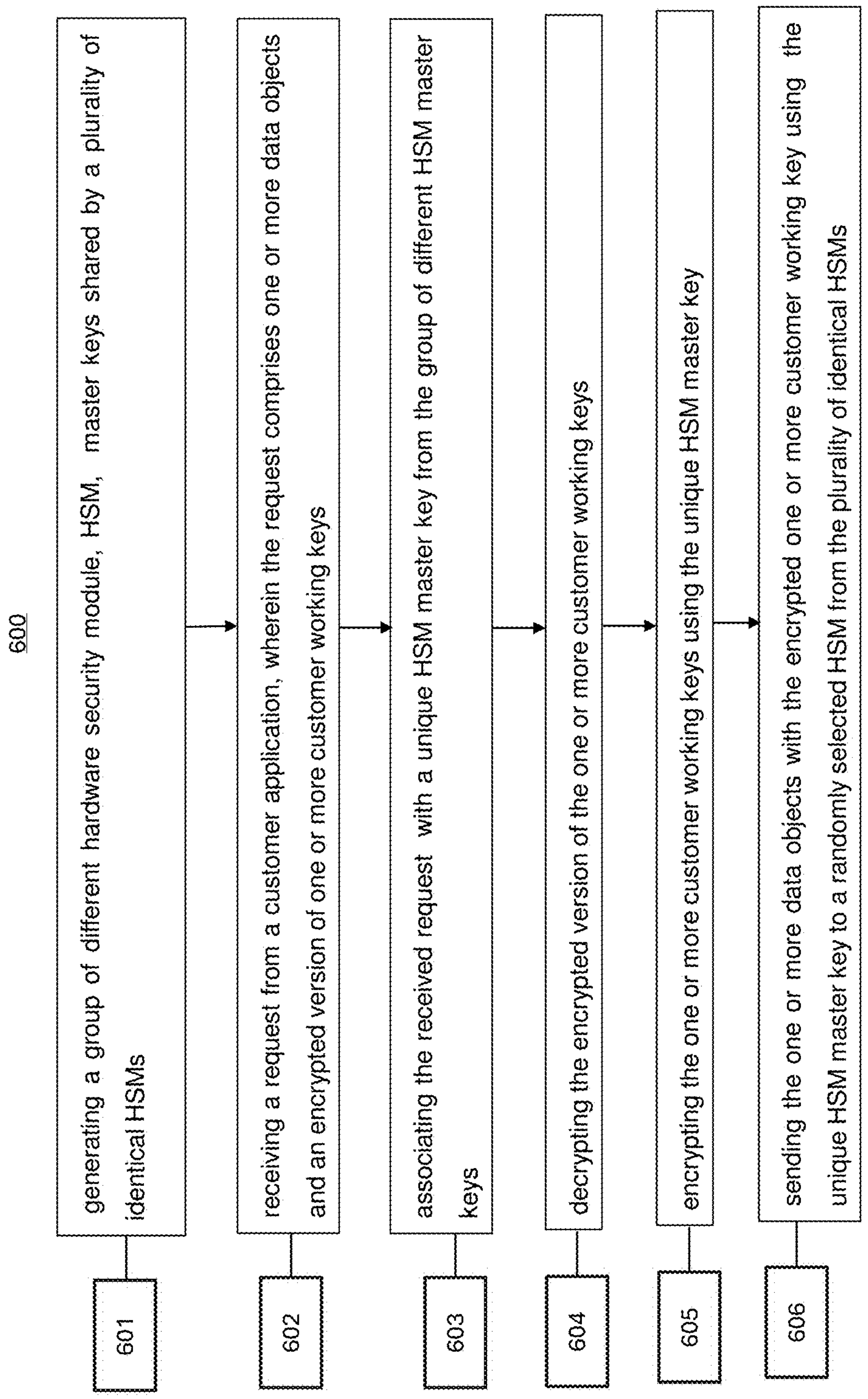
FIG. 6 is a flow chart illustrating a method performed by a computing device according to some embodiments.

Referring to FIG. 6, there is illustrated a method 600 performed by a computing device 20 for processing data objects, such as cryptographic data objects, in a cloud-based system 100 according to some embodiments. The method 600 comprises:

- generating (601) a group of different hardware security module, HSM, master keys shared by a plurality of identical HSMs;
- receiving (602) a request from a customer application, wherein the request comprises one or more data objects and an encrypted version of one or more customer working keys;
- associating (603) the received request with a unique HSM master key from the group of different HSM master keys;
- decrypting (604) the encrypted version of the one or more customer working keys;
- encrypting (605) the one or more customer working keys using the unique HSM master key; and
- sending (606) the one or more data objects with the encrypted one or more customer working keys using the unique HSM master key to a randomly selected HSM from the plurality of identical HSMs.

Each HSM master key of the group of HSM master keys is different from each other so that it is identifiable. Since the plurality of HSMs are identical and share a group of HSM master keys, advantageously, any HSM can be used for cryptographic process, reducing the complexity and operation overhead in case any HSM device fails. Optionally, by "identical HSMs" it means that the configurations of the HSMs are the same.

According to some embodiments herein, the unique HSM master key is chosen randomly.

According to some embodiments herein, the group of HSM master keys and the one or more customer master keys are stored encrypted using derived storage keys. It is normal for key material (e.g., keys) to be stored in a database encrypted under a storage key. To provide additional security by customer separation, it is normal for the storage key for a customer A to be different from the storage key for customer B.

With many customers, this becomes a bit of a significant overhead to create a single storage key for each customer. Therefore, it is common to derive a storage key, that is, to take a master key and then use some customer specific information to generate/calculate a storage key unique to the customer. This storage key is then used to encrypt the key material. The term "derived storage keys" may be used to indicate that the storage key used to encrypt the customer data will be different for each customer. F or details regarding derived storage keys, https://en.wikipedia.org/wiki/Derived_unique_key_per_transaction may be used as a reference which describes is a key management scheme in which for every transaction, a unique key is used which is derived from a fixed key.

According to some embodiments herein, the method further comprises receiving a customer master key that is encrypted by a one-time session key from a secure hardware device. Optionally, the one or more customer master keys are stored in a central storage of the computing device. Optionally, the one or more customer master keys are received from the secure hardware device.

According to some embodiments, the customer master key is only handled by the computing device, and not required by an HSM. Advantageously, it may reduce the opportunity for a potential attack. Single use elements (such as one-time session keys) are a valuable tool when it comes to minimising an attack.

According to some embodiments herein, the one-time session key and the customer master key are generated in a secure hardware device. The customer master key is generated by combining one or more individual key shares that are stored on one or more individual secure tokens. A secure token may also be referred to as a security token. A key share may be a cryptographic key component, or a key component.

According to some embodiments herein, the encrypted version of one or more customer working keys is encrypted with one or more customer master keys. In some embodiments, a subset of the one or more data objects of the received request is encrypted with one or more customer master keys.

According to some embodiments herein, the method is used for at least one of the following: card payment processing and e-commerce payment processing by the customer application.

According to some embodiments herein, the one or more data objects relate to security and data integrity management between a client device and the customer application. A client device may be a personal computer, a laptop computer, a tablet computer, a cellular phone, a smartphone, or some other type of client device.

Figure 7:
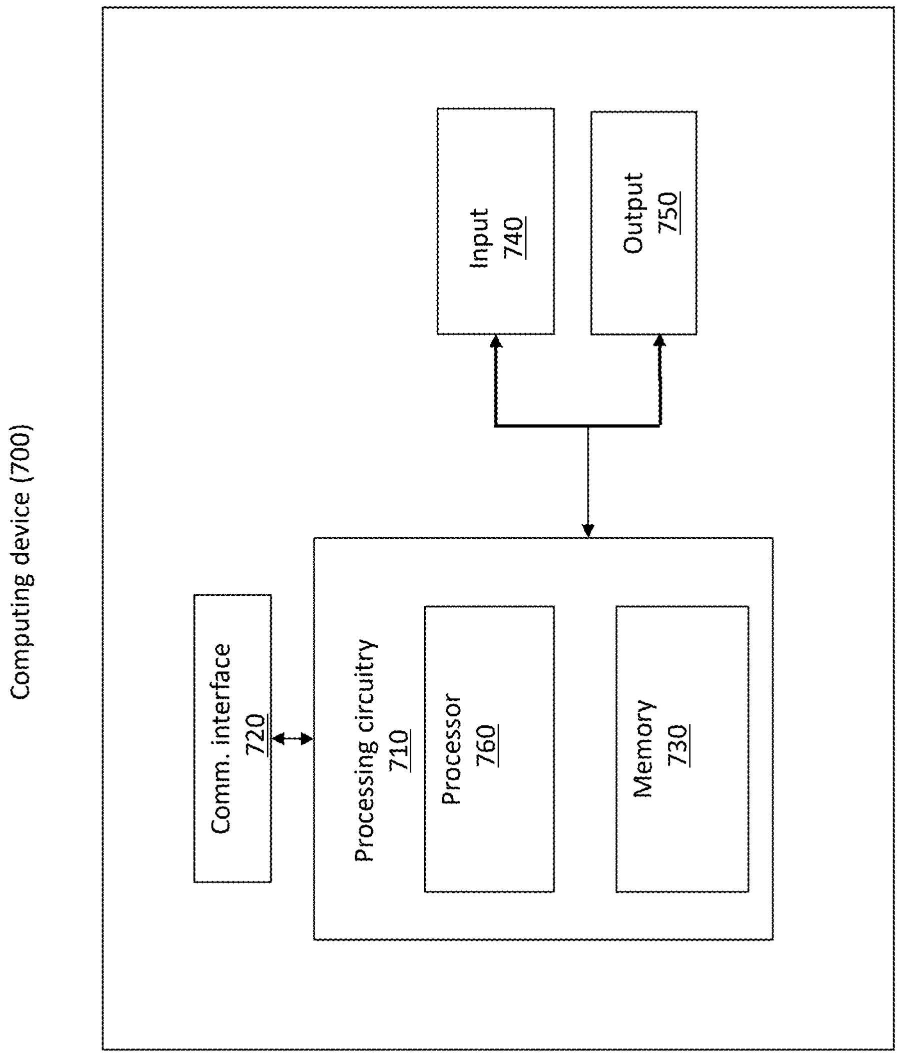
FIG. 7 is a simplified block diagram depicting a computing device according to some embodiments.

FIG. 7 illustrates a simplified block diagram depicting a computing device 700. The computing device may comprise an input 740, an output 750, a communication interface 720, and a processing circuitry 710 that is configured to cause the computing device 700 to perform a set of operations, or steps, as disclosed above. The processing circuitry 710 may comprises a processor 760 and a memory 730 wherein the memory 730 contains instructions executable by the processor 760. For example, the memory 730 may store the set of operations, and the processing circuitry 710 may be configured to retrieve the set of operations from the memory 730 to cause the computing device 700 to perform the set of operations. The set of operations may be provided as a set of executable instructions. Thus, the processing circuitry 710 is thereby arranged to execute methods as herein disclosed. The memory 730 may also comprise persistent storage, which, for example, can be any single one or combination of magnetic memory, optical memory, solid state memory or even remotely mounted memory.

In some embodiments, the computing device may be a general-purpose computer, a special purpose computer, a laptop, a desktop, a mobile device, a mobile terminal, a wireless terminal, a mobile station, a smartphone, a user equipment (UE), a tablet, or a display with one or more processors. In some embodiments, the computing device may be a conventional standalone hardware device. Alternatively, the functions of the computing device may be distributed across a network of multiple computer systems and architectures. In some embodiments, the memory 730 is a central storage system used for storing keys such as customer master keys and HSM master keys.

There is also provided a computer program comprising instructions which when executed on at least one processor 760 of the computing device 700, cause the at least said one processor 760 to carry out the actions or method steps presented herein.

A carrier is also provided containing the computer program, wherein the carrier is one of a computer readable storage medium, an electronic signal, optical signal, or a radio signal.

According to some embodiments, there is a computing device 700 for processing data objects in a cloud-based system. The computing device is operative to:

- generate a group of different hardware security module, HSM, master keys shared by a plurality of identical HSMs;
- receive a request from a customer application, wherein the request comprises one or more data objects and an encrypted version of a customer working key;
- associate the received request with a unique HSM master key from the group of different HSM master keys;
- decrypt the encrypted version of the one or more customer working keys;
- encrypt the one or more customer working keys using the unique HSM master key; and
- send the one or more data objects with the encrypted one or more customer working keys using the unique HSM master key to a randomly selected HSM from the plurality of identical HSMs.

In some embodiments, the unique HSM master key is chosen randomly.

In some embodiments, the group of HSM master keys and the customer master key are stored encrypted using derived storage keys.

In some embodiments, the computing device is further operative to receive a customer master key that is encrypted by a one-time session key from one or more secure hardware devices.

In the present disclosure, the terms "secure hardware device" and "secure device" may be used interchangeably.

In some embodiments, the one-time session key and the customer master key are generated in the one or more secure hardware devices, and wherein the customer master key is generated by combining one or more individual key shares that are stored on one or more individual secure tokens.

In some embodiments, the one or more secure hardware devices are located at one or more physical locations. In some embodiments, the one or more physical locations comprise at least two different physical locations. Advantageously, the efforts to bring the security tokens together may be reduced by locating several (i.e., two or more) secure hardware devices at more than one physical location.

In some embodiments, the encrypted version of one or more customer working keys is encrypted with one or more customer master keys. In some embodiments, a subset of the one or more data objects of the received request is encrypted with one or more customer master keys.

In some embodiments, the computing device is used for at least one of the following: card payment processing and e-commerce payment processing by the customer application.

In some embodiments, the one or more data objects relate to security and data integrity management between a client device and the customer application.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation.

The invention claimed is:

1. A method performed by a computing device for processing data objects in a cloud-based system, the method comprising:

generating a group of different hardware security module, HSM, master keys shared by a plurality of identical HSMs;

receiving a request from a customer application, wherein the request comprises one or more data objects and an encrypted version of one or more customer working keys, wherein the encrypted version of the one or more customer working keys is encrypted with one or more customer master keys;

associating the received request with a unique HSM master key from the group of different HSM master keys;

decrypting the encrypted version of the one or more customer working keys;

encrypting the one or more customer working keys using the unique HSM master key; and sending the one or more data objects with the encrypted one or more customer working keys using the unique HSM master key to a randomly selected HSM from the plurality of identical HSMs.

2. The method according to claim 1, wherein the unique HSM master key is chosen randomly.

3. The method according to claim 1, wherein the group of HSM master keys and the one or more customer master keys are stored encrypted using derived storage keys.

4. The method according to claim 1, further comprising, receiving a customer master key that is encrypted by a one-time session key from a secure hardware device.

5. The method according to claim 4, wherein the one-time session key and the customer master key are generated in a secure hardware device, and wherein the customer master key is generated by combining one or more individual key shares that are stored on one or more individual secure tokens.

6. The method according to claim 1, where the method is used for at least one of the following: card payment processing and e-commerce payment processing by the customer application.

7. The method according to claim 1, where the one or more data objects relate to security and data integrity management between a client device and the customer application.

8. A computing device for processing data objects in a cloud-based system, the computing device comprising a processor and a memory containing instructions executable by said processor, wherein the computing device is operative to:

generate a group of different hardware security module, HSM, master keys shared by a plurality of identical HSMs;

receive a request from a customer application, wherein the request comprises one or more data objects and an encrypted version of one or more customer working keys, wherein the encrypted version of the one or more customer working keys is encrypted with one or more customer master keys;

associate the received request with a unique HSM master key from the group of different HSM master keys;

decrypt the encrypted version of the one or more customer working keys;

encrypt the one or more customer working keys using the unique HSM master key; and send the one or more data objects with the encrypted one or more customer working key keys using the unique HSM master key to a randomly selected HSM from the plurality of identical HSMs.

9. The computing device according to claim 8, wherein the unique HSM master key is chosen randomly.

10. The computing device according to claim 8, wherein the group of HSM master keys and the one or more customer master keys are stored encrypted using derived storage keys.

11. The computing device according to claim 8, wherein the computing device is further operative to: receive a customer master key that is encrypted by a one-time session key from one or more secure hardware devices.

12. The computing device according to claim 11, wherein the one-time session key and the customer master key are generated in the one or more secure hardware devices, and wherein the customer master key is generated by combining one or more individual key shares thatare stored on one or more individual secure tokens.

13. The computing device according to claim 11, wherein the one or more secure hardware devices are located atone or more physical locations.

14. The computing device according to claim 13, wherein the one or more physical locations comprise at least two different physical locations.

15. The computing device according to claim 8, where the computing device is used for at least one of the following: card payment processing and e-commerce payment processing by the customer application.

16. The computing device according to claim 8, where the one or more data objects relate to security and data integrity management between a client device and the customer application.

* * * * *